US011104182B2

(12) United States Patent
Kawagoe et al.

(10) Patent No.: US 11,104,182 B2
(45) Date of Patent: Aug. 31, 2021

(54) TIRE

(71) Applicant: SUMITOMO RUBBER INDUSTRIES, LTD., Hyogo (JP)

(72) Inventors: Yoshifumi Kawagoe, Hyogo (JP); Sawa Ogihara, Hyogo (JP); Daisuke Aoki, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 181 days.

(21) Appl. No.: 16/296,781

(22) Filed: Mar. 8, 2019

(65) Prior Publication Data
US 2019/0308460 A1 Oct. 10, 2019

(30) Foreign Application Priority Data

Apr. 10, 2018 (JP) .............................. JP2018-075597
Apr. 10, 2018 (JP) .............................. JP2018-075598

(51) Int. Cl.
B60C 11/03 (2006.01)
B60C 11/04 (2006.01)
(Continued)

(52) U.S. Cl.
CPC ...... B60C 11/0304 (2013.01); B60C 11/0309 (2013.01); B60C 11/04 (2013.01);
(Continued)

(58) Field of Classification Search
CPC ............. B60C 11/0304; B60C 11/1236; B60C 11/1209; B60C 11/0365; B60C 11/12
See application file for complete search history.

(56) References Cited

U.S. PATENT DOCUMENTS

2014/0305563 A1* 10/2014 Kujime ............... B60C 11/1236
152/209.18
2015/0273948 A1* 10/2015 Kamigori ............... B60C 11/01
152/209.8
(Continued)

FOREIGN PATENT DOCUMENTS

EP 2108531 A2 10/2009
EP 3000621 A2 3/2016
(Continued)

OTHER PUBLICATIONS

Ochi, JP-2005162145-A Machine Translation (Year: 2005).*
European Search Report, European patent Office, Application No. 19162629.0, dated Aug. 13, 2019.

Primary Examiner — Robert C Dye
Assistant Examiner — Jack Edmondson Odom
(74) Attorney, Agent, or Firm — Greenblum & Bernstein P.L.C.

(57) ABSTRACT

An outer shoulder land region includes first shoulder lateral grooves each extending axially inwardly from an outer tread ground contact edge to have a first inner end in the tyre axial direction within the outer shoulder land region, first outer shoulder lateral sipes each connecting between the first inner end and an outer shoulder main groove, and second outer shoulder lateral sipes each extending axially inwardly from the outer tread ground contact edge to have a second inner end positioned on an axially outer side of the first inner ends. An outer middle land region includes outer middle lateral sipes each smoothly connected with the respective first outer (Continued)

shoulder lateral sipe with the outer shoulder main groove therebetween. Each of the outer middle lateral sipes connects between the outer shoulder main groove and an outer crown main groove and has a third inner end within the outer middle land region.

20 Claims, 5 Drawing Sheets

(51) Int. Cl.
 *B60C 11/12* (2006.01)
 *B60C 11/13* (2006.01)
(52) U.S. Cl.
 CPC ........ *B60C 11/042* (2013.01); *B60C 11/1204* (2013.01); *B60C 11/1236* (2013.01); *B60C 11/1263* (2013.01); *B60C 11/1384* (2013.01); *B60C 11/1392* (2013.01); *B60C 2011/039* (2013.01); *B60C 2011/0353* (2013.01); *B60C 2011/0358* (2013.01); *B60C 2011/0372* (2013.01); *B60C 2011/0381* (2013.01); *B60C 2011/0383* (2013.01); *B60C 2011/0386* (2013.01); *B60C 2011/0388* (2013.01); *B60C 2011/1209* (2013.01); *B60C 2011/1254* (2013.01); *B60C 2011/1268* (2013.01)

(56) References Cited

U.S. PATENT DOCUMENTS

| | | | |
|---|---|---|---|
| 2016/0082780 A1* | 3/2016 | Nagahara | B60C 11/1392 152/209.18 |
| 2016/0144664 A1* | 5/2016 | Kimura | B60C 11/0327 152/209.22 |
| 2016/0185160 A1* | 6/2016 | Mukai | B60C 11/1307 152/209.24 |
| 2017/0015144 A1* | 1/2017 | Ogihara | B60C 11/1307 |

FOREIGN PATENT DOCUMENTS

| | | | |
|---|---|---|---|
| EP | 3023267 A1 | | 5/2016 |
| EP | 3260308 A1 | | 12/2017 |
| JP | H0848114 A | | 2/1996 |
| JP | 2005162145 A | * | 6/2005 |
| JP | 2013-100020 A | | 5/2013 |
| JP | 2015168356 A | | 9/2015 |
| JP | 2016022800 A | | 2/2016 |

* cited by examiner

TIRE

TECHNICAL FIELD

The present invention relates to a tyre having improved drainage performance while maintaining steering stability performance and noise performance.

BACKGROUND ART

As disclosed in Japanese Unexamined Patent Application Publication No. 2013-100020 (Patent Literature 1), various kinds of tyres having improved drainage performance have been proposed conventionally.

SUMMARY OF THE INVENTION

However, even with the technology shown in Patent Literature 1, it is not easy to realize all of the steering stability performance, the noise performance, and the drainage performance at a high level, therefore, there has been a demand for further improvement.

The present invention was made in view of the above, and a primary object thereof is to provide a tyre having improved drainage performance while maintaining the steering stability performance and the noise performance.

In one aspect of the present invention, a tyre comprises a tread portion comprising a first tread ground contact edge positioned on one side of a tyre equator, a second tread ground contact edge positioned on the other side of the tyre equator, first shoulder main groove extending continuously in a tyre circumferential direction on a side of the first tread ground contact edge, a first crown main groove extending continuously in the tyre circumferential direction between the first shoulder main groove and the tyre equator, a first middle land region defined between the first shoulder main groove and the first crown main groove, and a first shoulder land region defined between the first tread ground contact edge and the first shoulder main groove, wherein the first shoulder land region is provided with a plurality of first shoulder lateral grooves each extending inwardly in a tyre axial direction from the first tread ground contact edge to have a first inner end in the tyre axial direction within the first shoulder land region, first shoulder lateral sipes each connecting between the first inner end of a respective one of the first shoulder lateral grooves and the first shoulder main groove, and a plurality of second shoulder lateral sipes each extending inwardly in the tyre axial direction from the first tread ground contact edge to have a second inner end on an outer side in the tyre axial direction of the first inner end, the first middle land region is provided with a plurality of middle lateral sipes each smoothly connected with a respective one of the first shoulder lateral sipes with the first shoulder main groove therebetween, and the middle lateral sipes include first middle lateral sipes each connecting between the first shoulder main groove and the first crown main groove and second middle lateral sipes each having a third inner end within the first middle land region.

In another aspect of the invention, it is preferred that each of the second shoulder lateral sipes is arranged between the first shoulder lateral grooves adjacent to each other in the tyre circumferential direction.

In another aspect of the invention, it is preferred that a length in the tyre axial direction of each of the first shoulder lateral grooves is in a range of from 50% to 75% of a length in the tyre axial direction of the first shoulder land region.

In another aspect of the invention, it is preferred that an angle of each of the first shoulder lateral grooves with respect to the tyre axial direction is in a range of from 5 to 12 degrees.

In another aspect of the invention, it is preferred that an angle of each of the middle lateral sipes with respect to the tyre axial direction is in a range of from 5 to 35 degrees.

In another aspect of the invention, it is preferred that a length in the tyre axial direction of each of the second shoulder lateral sipes is in a range of from 30% to 75% of a length in the tyre axial direction of the first shoulder land region.

In another aspect of the invention, it is preferred that a length in the tyre axial direction of each of the second middle lateral sipes is in a range of from 35% to 70% of a length in the tyre axial direction of the first middle land region.

In another aspect of the invention, it is preferred that the tread portion further comprises a second shoulder main groove extending continuously in the tyre circumferential direction on a side of the second tread ground contact edge, a second crown main groove extending continuously in the tyre circumferential direction between the second shoulder main groove and the tyre equator, and a second middle land region defined between the second shoulder main groove and the second crown main groove, wherein the second middle land region is provided with a plurality of first middle lateral grooves each extending inwardly in the tyre axial direction from the second shoulder main groove to have a fourth inner end in the tyre axial direction within the second middle land region, third middle lateral sipes each connecting between the fourth inner end of a respective one of the first middle lateral grooves and the second crown main groove, a plurality of second middle lateral grooves each extending inwardly in the tyre axial direction from the second shoulder main groove to have a fifth inner end in the tyre axial direction within the second middle land region, and fourth middle lateral sipes each extending inwardly in the tyre axial direction from the fifth inner end of a respective one of the second middle lateral grooves to have a sixth inner end in the tyre axial direction within the second middle land region, and a length in the tyre axial direction of each of the second middle lateral grooves is 50% or more of a length in the tyre axial direction of the second middle land region.

In another aspect of the invention, it is preferred that each of the second middle lateral grooves are provided between the first middle lateral grooves adjacent to each other in the tyre circumferential direction.

In another aspect of the invention, it is preferred that a length in the tyre axial direction of each of the first middle lateral grooves is 50% or more of a length in the tyre axial direction of the second middle land region.

In another aspect of the invention, it is preferred that each of fifth middle lateral sipes is provided between a respective one of pairs of the first inner middle lateral groove and the second inner middle lateral groove adjacent to each other in the tyre circumferential direction, and each of the fifth middle lateral sipes extends inwardly in the tyre axial direction from the second shoulder main groove to have a seventh inner end in the tyre axial direction within the second middle land region.

In another aspect of the invention, it is preferred that the first middle lateral grooves and the second middle lateral grooves are inclined in the same direction with respect to the tyre axial direction.

In another aspect of the invention, it is preferred that a length in the tyre axial direction of each of the first middle lateral grooves is in a range of from 60% to 80% of a length in the tyre axial direction of the second middle land region.

In another aspect of the invention, it is preferred that the tread portion is provided with a second shoulder land region defined between the second tread ground contact edge and the second shoulder main groove, and the second shoulder land region is provided with a plurality of second shoulder lateral grooves each extending inwardly in the tyre axial direction from the second tread ground contact edge to have a eighth inner end in the tyre axial direction within the second shoulder land region, and third shoulder lateral sipes each connecting between the eighth inner end of a respective one of the second shoulder lateral grooves and the second shoulder main groove.

In another aspect of the invention, it is preferred that a length in the tyre axial direction of each of the second shoulder lateral grooves is 50% or more of a length in the tyre axial direction of the second shoulder land region.

In another aspect of the invention, it is preferred that an angle of each of the second shoulder lateral grooves with respect to the tyre axial direction is in a range of from 5 to 12 degrees.

In another aspect of the invention, it is preferred that the tread portion is provided with a plurality of fourth shoulder lateral sipes each connecting between the second tread ground contact edge and the second shoulder main groove, and each of the fourth shoulder lateral sipes is arranged between a respective pair of the second shoulder lateral grooves adjacent to each other in the tyre circumferential direction.

In another aspect of the invention, it is preferred that a groove width of the first shoulder main groove is smaller than a groove width of the first crown main groove.

In another aspect of the invention, it is preferred that a groove width of the first shoulder main groove is smaller than a groove width of the second shoulder main groove and a groove width of the second crown main groove.

In another aspect of the invention, it is preferred that, when the tyre is mounted on a vehicle, the first tread ground contact edge is an outer tread ground contact edge positioned on an outer side of the vehicle.

DESCRIPTION OF THE PREFERRED EMBODIMENT

An embodiment of the present invention will now be described in conjunction with accompanying drawings.

Figure 1:
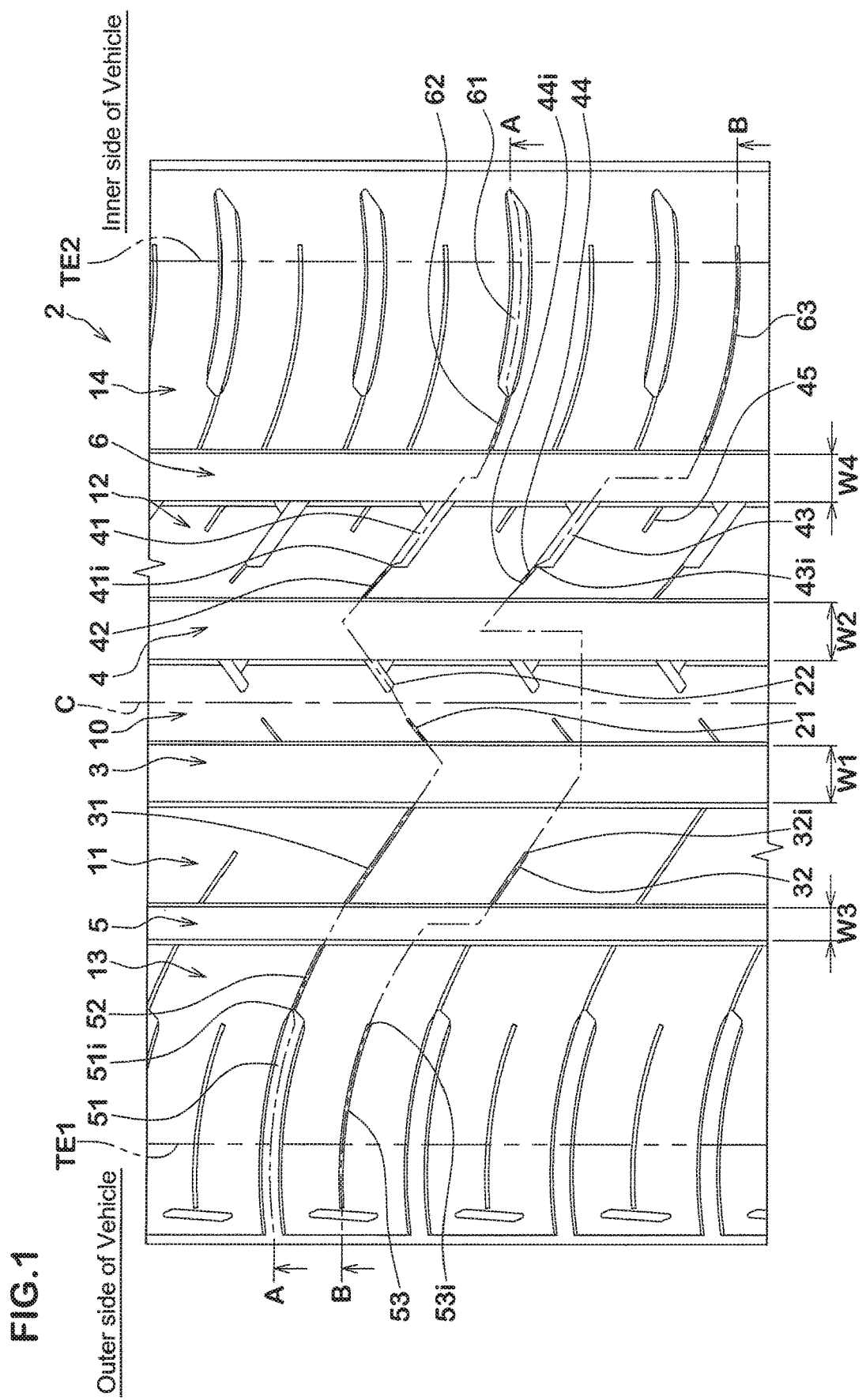
FIG. 1 is a development view of a tread portion of a tyre as an embodiment of the present invention.

FIG. 1 is a development view of a tread portion 2 of a tyre according to an embodiment of the present invention. As shown in FIG. 1, the tyre in this embodiment is suitably used as a pneumatic tyre for a passenger car, for example, but it is not limited thereto.

The tyre in this embodiment is provided with an asymmetric tread pattern whose position when mounted on a vehicle is specified. The mounting position of the tyre on a vehicle is indicated by letters and the like on at least one of sidewall portions (not shown), for example.

The tread portion 2 includes a tread ground contact edge TE1 positioned on one side of a tyre equator (C) and a tread ground contact edge TE2 positioned on the other side of the tyre equator (C).

The tread ground contact edges TE1 and TE2 means outermost tread ground contact edges in a tyre axial direction when the tyre in a standard state is in contact with a flat surface with zero camber angles by being loaded with a standard tyre load. Here, the standard state is a state in which the tyre is mounted on a standard rim (not shown), inflated to a standard tyre inner pressure, and loaded with no tyre load. Hereinafter, dimensions and the like of various parts of the tyre are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard tyre inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tyre is for a passenger car, the standard inner pressure is 180 kPa, for example.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. When the tyre is for a passenger car, the standard tyre load is a load equivalent to 88% of the above load.

In this embodiment, it is preferred that the tyre is used such that, when the tyre is mounted on a vehicle, the tread ground contact edge TE1 is an outer tread ground contact edge positioned on an outer side of the vehicle. However, the tyre may be used such that when the tyre is mounted on a vehicle, the tread ground contact edge TE1 is an inner tread ground contact edge positioned on an inner side of the vehicle. A case will be described below in which the tread ground contact edge TE1 is the outer tread ground contact edge and the tread ground contact edge TE2 is the inner tread ground contact edge.

The tread portion 2 includes an outer shoulder main groove 5 (a first shoulder main groove) extending continuously in the tyre circumferential direction on a side of the outer tread ground contact edge TE1 (a first tread ground contact edge), and an outer crown main groove 3 (a first crown main groove) extending continuously in the tyre circumferential direction between the outer shoulder main groove 5 and the tyre equator (C). The tread portion 2 includes an inner shoulder main groove 6 (a second shoulder main groove) extending continuously in the tyre circumferential direction on a side of the inner tread ground contact edge TE2 (a second tread ground contact edge), and an inner crown main groove 4 (a second crown main groove) extending continuously in the tyre circumferential direction between the in r shoulder main groove 6 and the tyre equator (C).

It is possible that a groove width W1 of the outer crown main groove 3, a groove width W2 of the inner crown main groove 4, a groove width W3 of the outer shoulder main grooves 5, and a groove width W4 of the inner shoulder main grooves 6 are arbitrarily determined according to the custom. In a case of the pneumatic tyre in this embodiment for a passenger car, it is preferred that each of the groove widths W1, W2, W3, and W4 are in a range of from 4.0% to 8.5% of a tread ground contacting width TW, for example.

The tread ground contacting width TW is a distance in the tyre axial direction between the tread ground contact edges TE1 and TE2 when the tyre in the standard state is in contact with a flat surface with zero camber angles by being loaded with the standard tyre load.

When any one of the groove widths W1, W2, W3, and W4 is less than 4.0% of the tread ground contacting width TW, it is possible that the drainage performance is affected. On the other hand, when any one of the groove widths W1, W2, W3, and W4 is more than 8.5% of the tread ground contacting width TW, a rubber volume of the tread portion 2 is decreased, therefore, it is possible that anti-wear performance is affected.

Figure 2A:
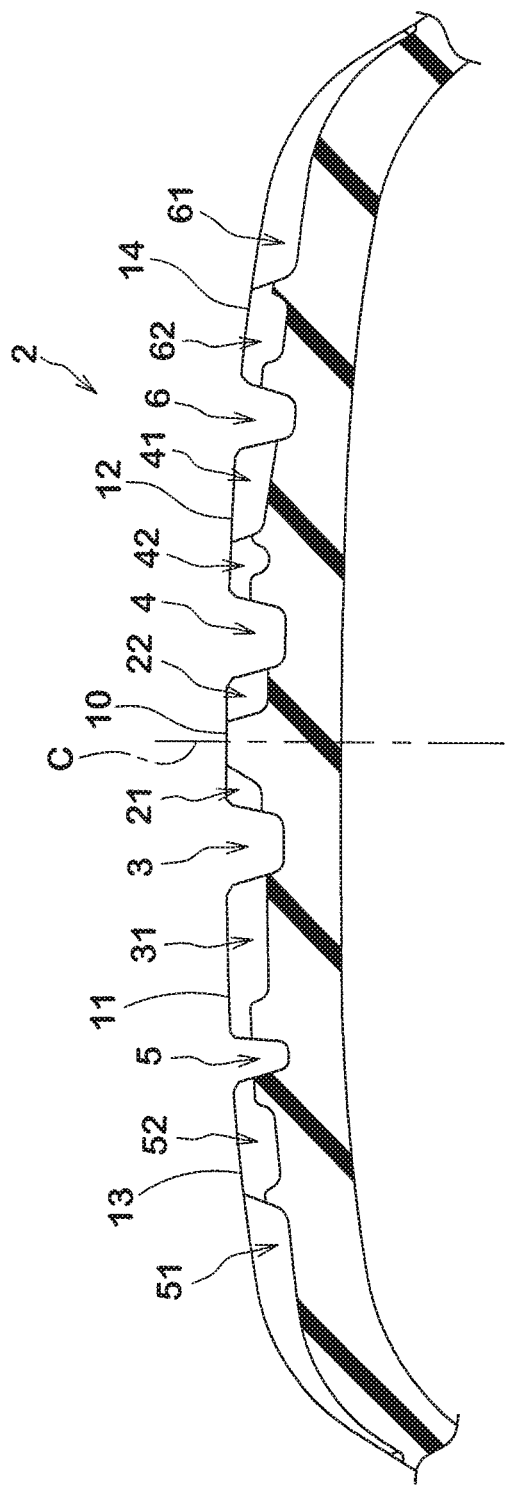
FIG. 2A is a cross-sectional view taken along A-A line of FIG. 1.
Figure 2B:
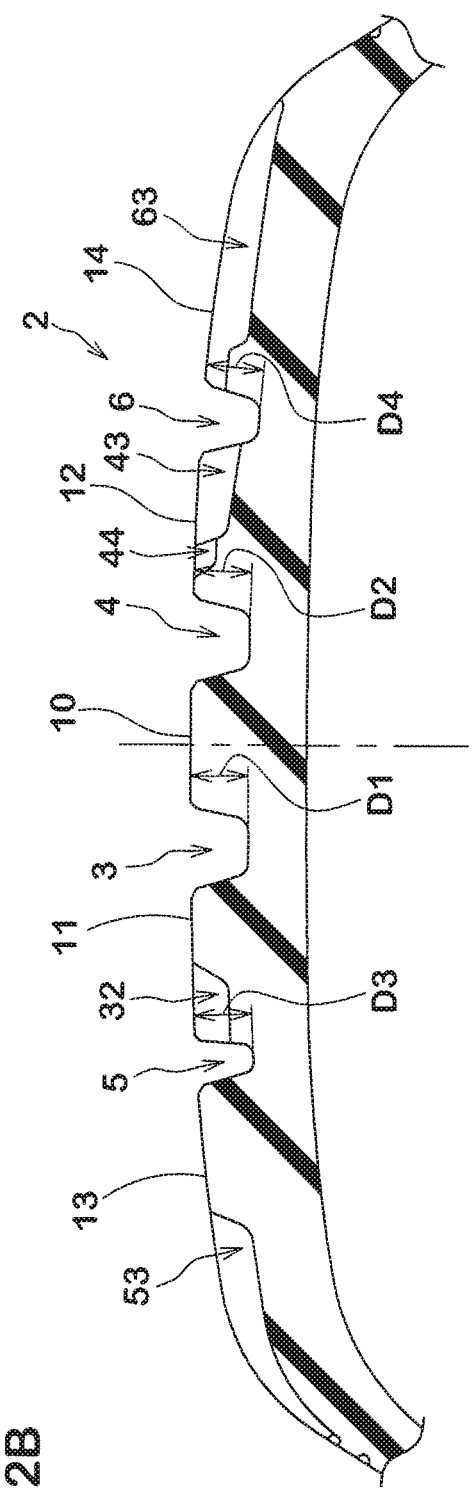
FIG. 2B is a cross-sectional view taken along B-B line of FIG. 1.

FIG. 2A is a cross-sectional view of the tread portion 2 taken along A-A line of FIG. 1. FIG. 2B is a cross-sectional view of the tread portion 2 taken along B-B line of FIG. 1. As shown in FIGS. 2A and 2B, it is possible that a depth D1 of the outer crown main groove 3, a depth D2 of the inner crown main groove 4, a depth D3 of the outer shoulder main groove 5, and a depth D4 of the inner shoulder main groove 6 are arbitrarily determined according to the custom. In a case of the pneumatic tyre in this embodiment for a passenger car, it is preferred that each of the depths D1, D2, D3, and D4 are in a range of from 5 to 10 mm, for example.

When any one of the depths D1, D2, D3, and D4 is less than 5 mm, it is possible that the drainage performance is affected. On the other hand, when any one of the depths D1, D2, D3, and D4 is more than 10 mm, rigidity of the tread portion 2 is insufficient, therefore, it is possible that the steering stability performance is affected.

The tread portion 2 has a crown land region 10 defined between the outer crown main groove 3 and the inner crown main groove 4. The tread portion 2 has an outer middle land region 11 (first middle land region) defined between the outer crown main groove 3 and the outer shoulder main groove 5. The tread portion 2 has an outer shoulder land region 13 (first shoulder land region) defined between the outer shoulder main groove 5 and the outer tread ground contact edge TE1. The tread portion 2 has an inner middle land region 12 (second middle land region) defined between the inner crown main groove 4 and the inner shoulder main groove 6. The tread portion 2 has an inner shoulder land region 14 (second shoulder land region) defined between the inner shoulder main groove 6 and the inner tread ground contact edge TE2.

Figure 3:
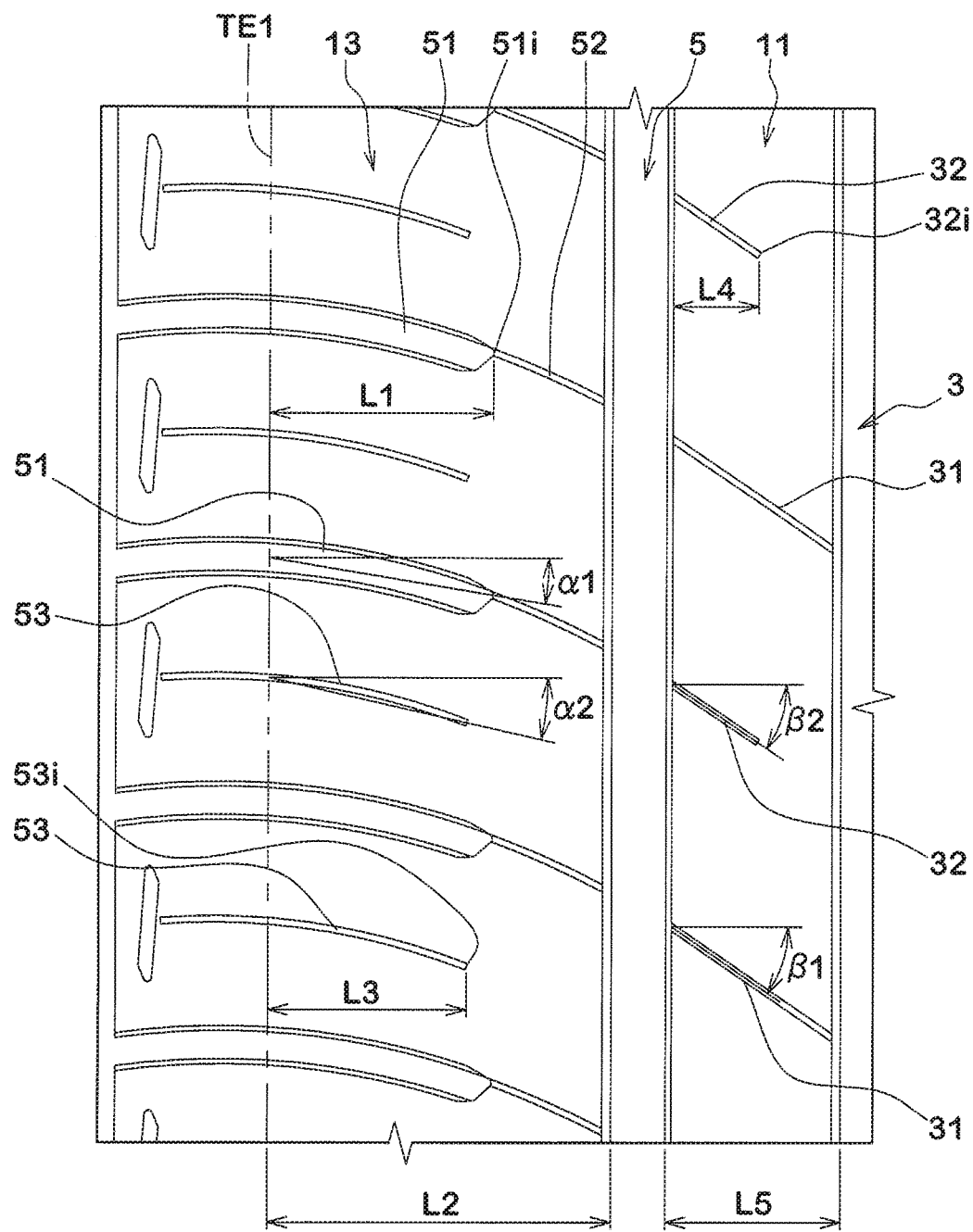
FIG. 3 is an enlarged development view of a middle land region and a shoulder land region positioned on an outer side of a vehicle of FIG. 1.

FIG. 3 shows the outer middle land region 11 and the outer shoulder land region 13.

The outer shoulder land region 13 is provided with a plurality of outer shoulder lateral grooves 51 (first shoulder lateral grooves), a plurality of first outer shoulder lateral sipes 52 (first shoulder lateral sipes), and a plurality of second outer shoulder lateral sipes 53 (second shoulder lateral sipes).

Each of the outer shoulder lateral grooves 51 extends inwardly in the tyre axial direction from the outer tread ground contact edge TE1 to have a first inner end (51i) in the tyre axial direction terminating within the outer shoulder land region 13. Each of the outer shoulder lateral grooves 51 extends obliquely with respect to the tyre axial direction in a curved manner. By the outer shoulder lateral grooves 51, the drainage performance of the outer shoulder land region 13 is improved. The outer shoulder lateral grooves 51 terminate within the outer shoulder land region 13, therefore, the noise performance of the tread portion 2 is improved and the rigidity of the outer shoulder land region 13 is increased, thereby, the steering stability performance is improved.

Each of the first outer shoulder lateral sipes 52 extends so as to connect between the first inner end (51i) of a respective one of the outer shoulder lateral grooves 51 and the outer shoulder main groove 5. Each of the first outer shoulder lateral sipes 52 is connected with a respective one of the outer shoulder lateral grooves 51 and extends obliquely in the same direction as the outer shoulder lateral grooves 51 in a curved manner.

Each of the second outer shoulder lateral sipes 53 extends inwardly in the tyre axial direction from the outer tread ground contact edge TE1 to have a second inner end (53i) terminating at a position on an outer side in the tyre axial direction of the first inner ends (51i). Each of the second outer shoulder lateral sipes 53 extends parallel with the outer shoulder lateral grooves 51, that is at equal intervals in the tyre circumferential direction, and obliquely in the same direction as the outer shoulder lateral grooves 51 in a curved manner.

By the first outer shoulder lateral sipes 52 and the second outer shoulder lateral sipes 53, the drainage performance of the outer shoulder land region 13 is further improved. Furthermore, the first outer shoulder lateral sipes 52 and the second outer shoulder lateral sipes 53 are closed by high ground contact pressure on a ground contacting surface. Thereby, it is possible that the drainage performance of the outer shoulder land region 13 is easily improved while suppressing deterioration of the noise performance and the steering stability performance.

In particular, the first outer shoulder lateral sipes 52 each connecting between a respective one of the outer shoulder lateral grooves 51 and the outer shoulder main groove 5 easily improve the drainage performance of the outer shoulder land region 13. On the other hand, by the second outer shoulder lateral sipes 53 terminating within the outer shoulder land region 13, continuity in the tyre circumferential direction of the outer shoulder land region 13 is maintained. Thereby, the noise performance of the tread portion 2 is easily improved and the rigidity of the outer shoulder land region 13 is easily increased, therefore, the steering stability performance is improved.

The outer middle land region 11 is provided with a plurality of outer middle lateral sipes 31 and 32 (middle lateral sipes) each extending inwardly in the tyre axial direction from the outer shoulder main groove 5. Each of the outer middle lateral sipes 31 and 32 is smoothly connected with a respective one of the first outer shoulder lateral sipes 52 with the outer shoulder main groove 5 therebetween. The expression that each of the outer middle lateral sipes 31 and 32 is smoothly connected with a respective one of the first outer shoulder lateral sipes 52 with the outer shoulder main groove 5 therebetween means that the outer middle lateral sipes 31 and 32 are at least in a positional relation with the first outer shoulder lateral sipes 52 in which the outer middle lateral sipes 31 and 32 are inclined in the same direction as the first outer shoulder lateral sipes 52 and an imaginary extended line obtained by extending each of the first outer shoulder lateral sipes 52 inwardly in the tyre axial direction and an imaginary extended line obtained by extending a respective one of the outer middle lateral sipes 31 and 32 outwardly in the tyre axial direction overlap each other or are slightly displaced from each other in the tyre circumferential direction. It is preferred that an amount of the displacement in the tyre circumferential direction is 2 mm or less, for example. Each of the first outer shoulder lateral sipes 52 and a respective one of the outer middle lateral sipes 31 and 32 which are smoothly connected with each other with the outer shoulder main groove 5 therebetween function as one continuous sipe, therefore, the drainage performance of the outer middle land region 11 and the outer shoulder land region 13 is easily improved.

By the outer middle lateral sipes 31 and 32 and the first outer shoulder lateral sipes 52 smoothly connected with each other as described above, the outer middle land region 11 and the outer shoulder land region 13 deform in the same mode along the outer middle lateral sipes 31 and 32 and the first outer shoulder lateral sipes 52. Thereby, for example, transient characteristics during cornering in which a center of the ground contacting surface shifts from the outer middle land region 11 to the outer shoulder land region 13 is improved, therefore, it is possible that excellent steering stability performance is obtained.

Each of the first outer middle lateral sipes 31 (first middle lateral sipes) extends so as to connect between the outer shoulder main groove 5 and the outer crown main groove 3. By the first outer middle lateral sipes 31 configured as such, the outer shoulder main groove 5 and the outer crown main groove 3 are connected with each other, therefore, it is possible that the drainage performance of the outer middle land region 11 is easily improved.

Each of the second outer middle lateral sipes 32 (second middle lateral sipes) has a third inner end (32i) terminating within the outer middle land region 11. By the second outer middle lateral sipes 32 terminating within the outer middle land region 11 as just described, the continuity in the tyre circumferential direction of the outer middle land region 11 is maintained. Thereby, the noise performance of the tread portion 2 is easily improved and the rigidity of the outer middle land region 11 is easily increased, therefore, the steering stability performance is improved.

The first outer middle lateral sipes 31 and the second outer middle lateral sipes 32 extend linearly or in an arc shape having a smaller curvature than the outer shoulder lateral grooves 51 and in parallel with each other. The first outer middle lateral sipes 31 and the second outer middle lateral sipes 32 configured as such contribute to improvement of the drainage performance of the outer middle land region 11.

Each of the second outer shoulder lateral sipes 53 is arranged between a respective pair of the outer shoulder lateral grooves 51 adjacent to each other in the tyre circumferential direction. Thereby, the outer shoulder lateral grooves 51 and the second outer shoulder lateral sipes 53 are arranged alternately, one by one, in the tyre circumferential direction, therefore, the drainage performance, the noise performance, and the steering stability performance are improved in a good balance.

It is preferred that a length L1 in the tyre axial direction of each of the outer shoulder lateral grooves 51 is in a range of from 50% to 75% of a length L2 in the tyre axial direction of the outer shoulder land region 13. When the length L1 is less than 50% of the length L2, it is possible that the drainage performance is affected. When the length L1 is more than 75% of the length L2, it is possible that the noise performance and the steering stability performance are affected.

It is preferred that an angle β1 of each of the first outer middle lateral sipes 31 with respect to the tyre axial direction is larger than an angle α1 of each of the outer shoulder lateral grooves 51 with respect to the tyre axial direction. The angle β1 is defined as an angle between the tyre axial direction and a straight line obtained by connecting between an inner end and an outer end of each of the first outer middle lateral sipes 31. The inner end is a point where a center line of each of the first outer middle lateral sipes 31 is connected with the outer crown main groove 3 and the outer end is a point where the center line is connected with the outer shoulder main groove 5. The angle α1 is defined as an angle between the tyre axial direction and a straight line obtained by connecting between a point where a center line of each of the outer shoulder lateral grooves 51 intersects with the outer tread ground contact edge TE1 and the first inner end (51i) thereof.

The angle β1 is set to be larger than the angle α1, therefore, it is possible that excellent drainage performance is obtained in the outer middle land region 11 during running straight. Further, it is possible that excellent drainage performance is obtained in the outer shoulder land region 13 during cornering.

It is preferred that an angle β2 of each of the second outer middle lateral sipes 32 with respect to the tyre axial direction is larger than the angle α1 of each of the outer shoulder lateral grooves 51 with respect to the tyre axial direction. The angle β2 is defined as an angle between the tyre axial direction and a straight line obtained by connecting between the third inner end (32i) and an outer end of each of the second outer middle lateral sipes 32. The outer end of each of the second outer middle lateral sipes 32 is where a center line thereof is connected with the outer shoulder main groove 5.

The angle β2 is set to be larger than the angle α1, therefore, it is possible that excellent drainage performance is obtained in the outer middle land region 11 during running straight. Further, it is possible that excellent drainage performance is obtained in the outer shoulder land region 13 during cornering.

It is preferred that the angle α1 of each of the outer shoulder lateral grooves 51 with respect to the tyre axial direction is in a range of from 5 to 12 degrees. When the angle α1 is less than 5 degrees, it is possible that the drainage performance during running straight is affected. When the angle α1 is more than 12 degrees, the rigidity in the tyre axial direction of the outer shoulder land region 13 is decreased, therefore, it is possible that the steering stability performance is affected.

It is preferred that the angle β1 of each of the first outer middle lateral sipes 31 with respect to the tyre axial direction is in a range of from 5 to 35 degrees. When the angle β1 is less than 5 degrees, it is possible that the drainage performance during running straight is affected. When the angle β1 is more than 35 degrees, the rigidity in n the tyre axial direction of the outer middle land region 11 is decreased, therefore, it is possible that the steering stability performance is affected.

It is preferred that the angle β2 of each of the second outer middle lateral sipes 32 with respect to the tyre axial direction is in a range of from 5 to 35 degrees. When the angle β2 is less than 5 degrees, it is possible that the drainage performance during running straight is affected. When the angle β2 is more than 35 degrees, the rigidity in the tyre axial direction of the outer middle land region 11 is decreased, therefore, it is possible that the steering stability performance is affected.

The angle β1 and the angle β2 in this embodiment are set to be equal. Thereby, the rigidity of the outer middle land region 11 in the tyre circumferential direction is made uniform, therefore, it is possible that excellent steering stability performance is obtained.

It is preferred that the angle α1 of each of the outer shoulder lateral grooves 51 with respect to the tyre axial direction is set to be equal to an angle α2 of each of the second outer shoulder lateral sipes 53 with respect to the tyre axial direction. The angle α2 is defined as an angle between the tyre axial direction and a straight line obtained by connecting the second inner end (53i) of each of the second outer shoulder lateral sipes 53 and a point where a center line thereof intersects with the outer tread ground contact edge TE1. The angle α1 and the angle α2 are set to be equal, therefore, the rigidity of the outer shoulder land region 13 in the tyre circumferential direction is made uniform, thereby, it is possible that excellent steering stability performance is obtained.

It is preferred that each of the outer shoulder lateral grooves 51 and the second outer shoulder lateral sipes 53 extends outwardly in the tyre axial direction beyond the outer tread ground contact edge TE1. Thereby, during cornering and the like, even when a ground contacting region of the outer shoulder land region 13 is expanded to the outer side in the tyre axial direction of the outer tread ground contact edge TE1, excellent drainage performance is maintained.

A length L3 in the tyre axial direction of each of the second outer shoulder lateral sipes 53 is smaller than the length L2 in the tyre axial direction of each of the outer shoulder land region 13. It is preferred that the length L3 is in a range of from 30% to 70% of the length L2. When the length L3 is less than 30% of the length L2, it is possible that the drainage performance is affected. When the length L3 is more than 70% of the length L2, it is possible that the noise performance and the steering stability performance are affected.

It is preferred that a length L4 in the tyre axial direction of each of the second outer middle lateral sipes 32 is in a range of from 35% to 70% of a length L5 in the tyre axial direction of the outer middle land region 11. When the length L4 is less than 35% of the length L5, it is possible that the drainage performance is affected. When the length L4 is more than 70% of the length L5, it is possible that the noise performance and the steering stability performance are affected.

It is preferred that the groove width W3 of the outer shoulder main groove 5 is smaller than the groove width W1 of the outer crown main groove 3. By the outer shoulder main groove 5 configured as such, it is possible that excellent noise performance and excellent steering stability performance are easily obtained. Note that, in this embodiment, the outer shoulder lateral grooves 51, the first outer shoulder lateral sipes 52, the second outer shoulder lateral sipes 53, the first outer middle lateral sipes 31, and the second outer middle lateral sipes 32 function organically, therefore, excellent drainage performance is maintained even in the outer shoulder main groove 5 described above.

It is preferred that the groove width W3 of the outer shoulder main groove 5 is smaller than the groove width W4 of the inner shoulder main groove 6. Further, it is preferred that the groove width W3 of the outer shoulder main groove 5 is smaller than the groove width W2 of the inner crown main groove 4. By the outer shoulder main groove 5 configured as such, similarly to the above, excellent noise performance and excellent steering stability performance are easily obtained and excellent drainage performance is maintained.

As shown in FIG. 2A, it is preferred that each of the first outer middle lateral sipes 31 has a depth larger at an inner end thereof in the tyre axial direction than at an outer end thereof in the tyre axial direction. Each of the inner end and the outer end of each of the first outer middle lateral sipes 31 extends in the tyre axial direction at the substantially constant depth, respectively. The first outer middle lateral sipes 31 configured as such, together with the second outer middle lateral sipes 32 having the third inner ends (32i), improve the drainage performance and the steering stability performance of the outer middle land region 11 in a good balance.

It is preferred that each of the first outer shoulder lateral sipes 52 has a depth larger at a center portion thereof in the tyre axial direction than at an inner end and an outer end thereof in the tyre axial direction. Each of the center portion, the inner end, and the outer end in the tyre axial direction of each of the first outer shoulder lateral sipes 52 extends in the tyre axial direction at the substantially constant depth, respectively. The first outer shoulder lateral sipes 52 configured as such improve the drainage performance and the steering stability performance of the outer shoulder land region 13 in a good balance.

Figure 4:
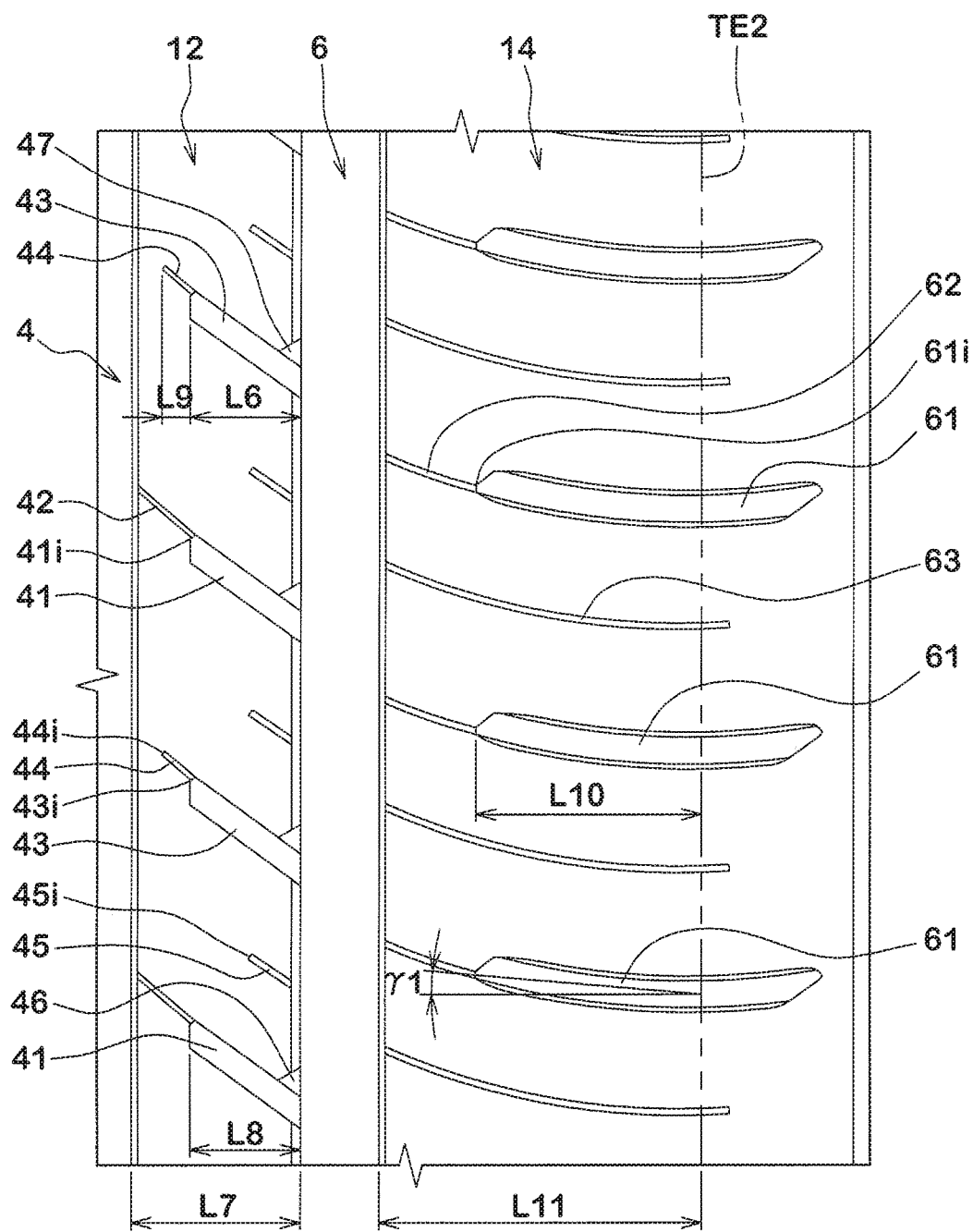
FIG. 4 is an enlarged development view of a middle land region and a shoulder land region positioned on an inner side of the vehicle of FIG. 1.

FIG. 4 shows the inner middle land region 12 and the inner shoulder land region 14.

The inner middle land region 12 is provided with a plurality of first inner middle lateral grooves 41 (first middle lateral grooves) and a plurality of second inner middle lateral grooves 43 (second middle lateral grooves). Each of the first inner middle lateral grooves 41 extends inwardly in the tyre axial direction from the inner shoulder main groove 6 to have a fourth inner end (41i) in the tyre axial direction terminating within the inner middle land region 12. Each of the second inner middle lateral grooves 43 extends inwardly in the tyre axial direction from the inner shoulder main groove 6 to have a fifth inner end (43i) in the tyre axial direction terminating within the inner middle land region 12. By the first inner middle lateral grooves 41 and the second inner middle lateral grooves 43 each connected with the inner shoulder main groove 6, the drainage performance of the inner middle land region 12 is improved.

In particular, it is preferred that a length L6 in the tyre axial direction of each of the second inner middle lateral grooves 43 is 50% or more of a length L7 in the tyre axial direction of the inner middle land region 12. By the second inner middle lateral grooves 43 configured as such, it is possible that the drainage performance of the inner middle land region 12 is easily improved.

The first inner middle lateral grooves 41 and the second inner middle lateral grooves 43 terminate within the inner middle land region 12, therefore, the noise performance of the tread portion 2 is improved and the rigidity of the inner middle land region 12 is increased, thereby, the steering stability performance is improved.

Each of the first inner middle lateral grooves 41 and the second inner middle lateral grooves 43 extends linearly or in an arc shape having a smaller curvature than each of inner shoulder lateral grooves 61 and in parallel with each other. The first inner middle lateral grooves 41 and the second inner middle lateral grooves 43 configured as such contribute to improvement of the drainage performance of the inner middle land region 12.

The inner middle land region 12 is further provide with a plurality of first inner middle lateral sipes 42 (third middle lateral sipes) and a plurality of second inner middle lateral sipes 44 (fourth middle lateral sipes). Each of the first inner middle lateral sipes 42 extends so as to connect between the fourth inner end (41i) of a respective one of the first inner middle lateral grooves 41 and the inner crown main groove 4. Each of the second inner middle lateral sipes 44 extends inwardly in the tyre axial direction from the fifth inner end (43i) of a respective one of the second inner middle lateral grooves 43 to have a sixth inner end (44i) in the tyre axial direction terminating within the inner middle land region 12.

By the first inner middle lateral sipes 42 and the second inner middle lateral sipes 44, the drainage performance of the inner middle land region 12 is further improved. Furthermore, the first inner middle lateral sipes 42 and the second inner middle lateral sipes 44 are closed by high ground contact pressure on the ground contacting surface. Thereby, it is possible that the drainage performance of the inner middle land region 12 is easily improved while suppressing deterioration of the noise performance and the steering stability performance.

In particular, the first inner middle lateral sipes 42 each connecting between the inner crown main groove 4 and a respective one of the first inner middle lateral grooves 41 easily improve the drainage performance of the inner middle land region 12. On the other hand, by the second inner middle lateral sipes 44 terminating within the inner middle land region 12, the continuity in the tyre circumferential direction of the inner middle land region 12 is maintained. Thereby, the noise performance of the tread portion 2 is easily improved and the rigidity of the inner middle land region 12 is easily increased, therefore, the steering stability performance is improved.

Each of the second inner middle lateral grooves 43 is arranged between the first inner middle lateral grooves 41 adjacent to each other in the tyre circumferential direction. Thereby, pairs of the first inner middle lateral groove 41 and the first inner middle lateral sipe 42 and pairs of the second inner middle lateral groove 43 and the second inner middle lateral sipe 44 are arranged alternately, one pair by one pair, in the tyre circumferential direction, therefore, the drainage performance, the noise performance, and the steering stability performance are improved in a good balance.

Each of the first inner middle lateral sipes 42 and the second inner middle lateral sipes 44 extends linearly or in an arc shape having a smaller curvature than each of inner shoulder lateral grooves 61 and in parallel with each other. The first inner middle lateral sipes 42 and the second inner middle lateral sipes 44 configured as such contribute to improvement of the drainage performance of the inner middle land region 12.

It is preferred that a length L8 in the tyre axial direction of each of the first inner middle lateral grooves 41 is 50% or more of the length L7 in the tyre axial direction of the inner middle land region 12. By the first inner middle lateral grooves 41 configured as such, it is possible that the drainage performance of the inner middle land region 12 is easily improved.

It is preferred that third inner middle lateral sipes 45 (fifth middle lateral sipes) are each provided between a respective pair of the first inner middle lateral groove 41 and the second inner middle lateral groove 43 adjacent to each other in the tyre circumferential direction. In other words, one third inner middle lateral sipes 45, one first inner middle lateral groove 41, one third inner middle lateral sipes 45, and one second inner middle lateral groove 43 are arranged in this order repeatedly in the tyre circumferential direction. Each of the third inner middle lateral sipes 45 extends inwardly in the tyre axial direction from the inner shoulder main groove 6 to have a seventh inner end (45i) in the tyre axial direction terminating within the inner middle land region 12. By the provision of the third inner middle lateral sipes 45 in the inner middle land region 12, it is possible that the drainage performance of the inner middle land region 12 is further improved.

It is preferred that the first inner middle lateral grooves 41 and the second inner middle lateral grooves 43 are inclined in the same direction with respect to the tyre axial direction. By the first inner middle lateral grooves 41 and the second inner middle lateral grooves 43 which are inclined in the same direction, it is possible that the drainage performance of the inner middle land region 12 is easily improved.

It is preferred that a first chamfered portion 46 is provided at a corner portion where each of the first inner middle lateral grooves 41 intersects with the inner shoulder main groove 6 at an acute angle. By the first chamfered portions 46, flows of water flowing from the first inner middle lateral grooves 41 to the inner shoulder main groove 6 are promoted, therefore, it is possible that the drainage performance of the inner middle land region 12 is easily improved. Further, by the first chamfered portions 46, stress at the corner portions is moderated.

It is preferred that a second chamfered portion 47 is provided at a corner portion where each of the second inner middle lateral grooves 43 intersects with the inner shoulder main groove 6 at an acute angle. By the second chamfered portions 47, flows of water flowing from the second inner middle lateral grooves 43 to the inner shoulder main groove 6 are promoted, therefore, it is possible that the drainage performance of the inner middle land region 12 is easily improved. Further, by the second chamfered portions 47, stress at the corner portions is moderated.

It is preferred that a length L9 in the tyre axial direction of each of the second inner middle lateral sipes 44 is in a range of from 15% to 35% of the length L6 in the tyre axial direction of each of the second inner middle lateral grooves 43. When the length L9 is less than 15% of the length L6, it is possible that the drainage performance is affected. When the length L9 is more than 35% of the length L6, it is possible that the noise performance and the steering stability performance are affected.

It is preferred that the length L8 in the tyre axial direction of each of the first inner middle lateral grooves 41 is in a range of from 60% to 80% of the length L7 in the tyre axial direction of the inner middle land region 12. When the length L8 is less than 60% of the length L7, it is possible that the drainage performance is affected. When the length L8 is more than 80% of the length L7, it is possible that the noise performance and the steering stability performance are affected.

The inner shoulder land region 14 in this embodiment is provided with a plurality of the inner shoulder lateral grooves 61 (second shoulder lateral grooves) and a plurality of first inner shoulder lateral sipes 62 (third shoulder lateral sipes).

Each of the inner shoulder lateral grooves 61 extends inwardly in the tyre axial direction from the inner tread ground contact edge TE2 to have an eighth inner end (61i) in the tyre axial direction terminating within the inner shoulder land region 14. Each of the inner shoulder lateral grooves 61 extends obliquely with respect to the tyre axial direction in a curved manner. By the inner shoulder lateral grooves 61, the drainage performance of the inner shoulder land region 14 is improved. The inner shoulder lateral grooves 61 terminate within the inner shoulder land region 14, therefore, the noise performance of the tread portion 2 is improved and the rigidity of the inner shoulder land region 14 is increased, thereby, the steering stability performance is improved.

Each of the first inner shoulder lateral sipes 62 extends so as to connect between the eighth inner end (61i) of a respective one of the inner shoulder lateral grooves 61 and the inner shoulder main groove 6. Each of the first inner shoulder lateral sipes 62 is connected with a respective one of the inner shoulder lateral grooves 61 and extends obliquely in the same direction as the inner shoulder lateral grooves 61 in a curved manner.

By the first inner shoulder lateral sipes 62 each connecting between a respective one of the inner shoulder lateral grooves 61 and the inner shoulder main groove 6, the drainage performance of the inner shoulder land region 14 is further improved. Furthermore, the first inner shoulder lateral sipes 62 are closed by high ground contact pressure on the ground contacting surface. Thereby, it is possible that the drainage performance of the inner shoulder land region 14 is easily improved while suppressing deterioration of the noise performance and the steering stability performance.

It is preferred that a length L10 in the tyre axial direction of each of the inner shoulder lateral grooves 61 is 50% or more of a length L11 in the tyre axial direction of the inner shoulder land region 14. By the inner shoulder lateral grooves 61 configured as such, it is possible that excellent drainage performance is easily obtained.

It is preferred that each of the inner shoulder lateral grooves 61 extends outwardly in the tyre axial direction beyond the inner tread ground contact edge TE2. Thereby, during cornering and the like, even when a ground contacting region of the inner shoulder land region 14 is expanded to the outer side in the tyre axial direction of the inner tread ground contact edge TE2, excellent drainage performance is maintained.

It is preferred that the angle γ1 of each of the inner shoulder lateral grooves 61 with respect to the tyre axial direction is in a range of from 5 to 12 degrees. The angle γ1 is defined as an angle between the tyre axial direction and a straight line obtained by connecting between a point where a center line of each of the inner shoulder lateral grooves 61 intersects with the inner tread ground contact edge TE2 and the eighth inner end (61i) thereof. When the angle γ1 is less than 5 degrees, it is possible that the drainage performance during running straight is affected, when the angle γ1 is more than 12 degrees, the rigidity in the tyre axial direction of the inner shoulder land region 14 is decreased, therefore, it is possible that the steering stability performance is affected.

The inner shoulder land region 14 in this embodiment is provided with a plurality of second inner shoulder lateral sipes 63 (fourth shoulder lateral sipes). Each of the second inner shoulder lateral sipes 63 extends so as to connect between the inner tread ground contact edge TE2 and the inner shoulder main groove 6. By the second inner shoulder lateral sipes 63, the drainage performance of the outer shoulder land region 13 is further improved. Furthermore, the second inner shoulder lateral sipes 63 are closed by high ground contact pressure on the ground contacting surface. Thereby, it is possible that the drainage performance of the outer shoulder land region 13 is easily improved while suppressing deterioration of the noise performance and the steering stability performance.

Each of the second inner shoulder lateral sipes 63 is arranged between a respective pair of the inner shoulder lateral grooves 61 adjacent to each other in the tyre circumferential direction. Thereby, the inner shoulder lateral grooves 61 and the second inner shoulder lateral sipes 63 are arranged alternately in the tyre circumferential direction, therefore, the drainage performance, the noise performance, and the steering stability performance are improved in a good balance.

As shown in FIG. 2A, it is preferred that each of the first inner middle lateral sipes 42 has a depth larger at a center portion thereof in the tyre axial direction than at an inner end and an outer end thereof in the tyre axial direction. The first inner middle lateral sipes 42 configured as such, together with the second inner middle lateral sipes 44 having the sixth inner ends (44i), improve the drainage performance and the steering stability performance of the inner middle land region 12 in a good balance.

It is preferred that each of the first inner shoulder lateral sipes 62 has a depth larger at a center portion thereof in the tyre axial direction than at an inner end and an outer end thereof in the tyre axial direction. Each of the center portion, the inner end, and the outer end in the tyre axial direction of each of the first inner shoulder lateral sipes 62 extends in the tyre axial direction at the substantially constant depth, respectively. The first inner shoulder lateral sipes 62 configured as such improve the drainage performance and the steering stability performance of the inner shoulder land region 14 in a good balance.

Figure 5:
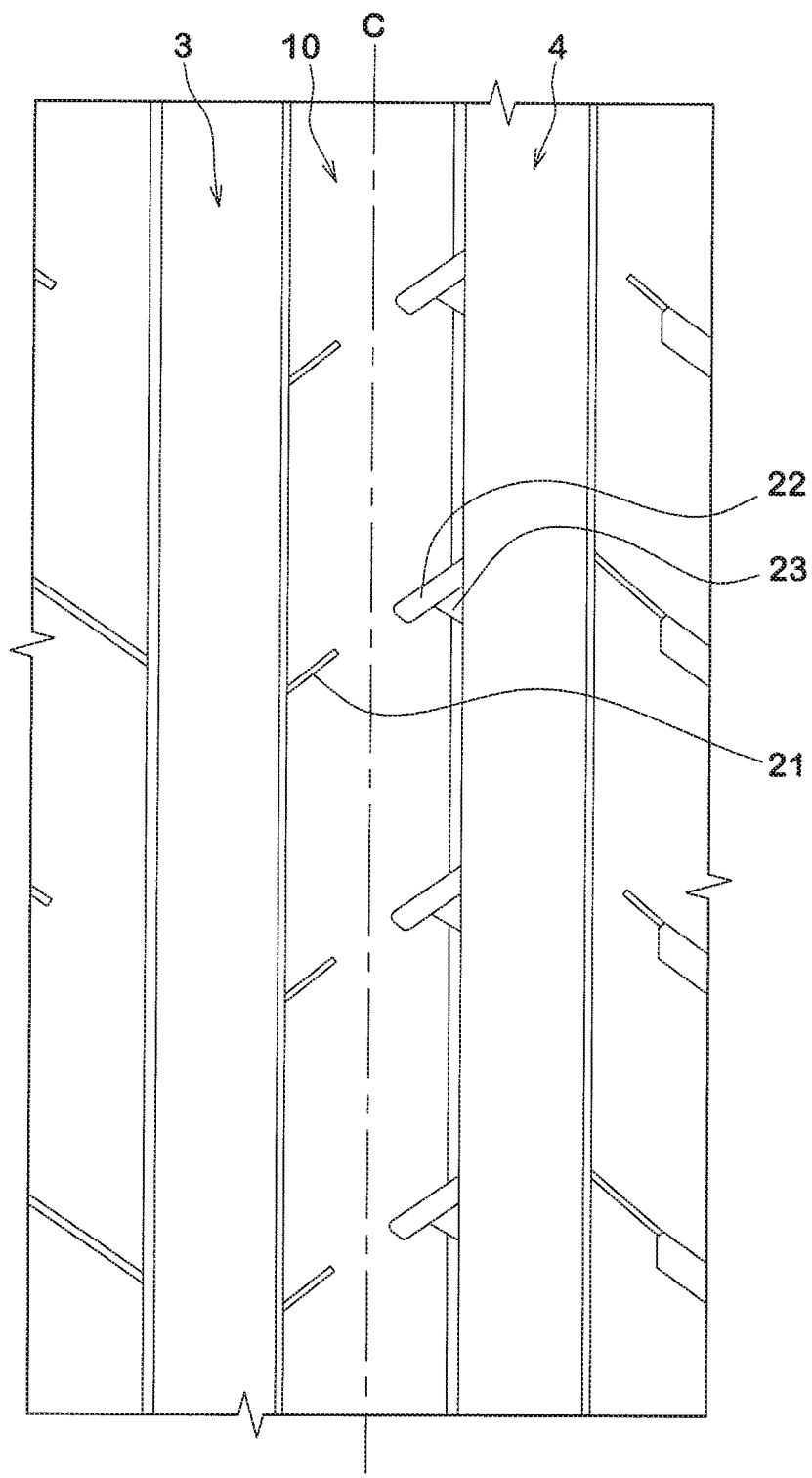
FIG. 5 is an enlarged development view of a crown land region of FIG. 1.

FIG. 5 shows the crown land region 10. The crown land region 10 is provided with crown lateral sipes 21 and crown lateral grooves 22. Each of the crown lateral sipes 21 extends inwardly in the tyre axial direction from the outer crown main groove 3 to have an inner end terminating before reaching the tyre equator (C). The crown lateral sipes 21 are inclined in a direction opposite to the first outer middle lateral sipes 31. Each of the crown lateral grooves 22 extends inwardly in the tyre axial direction from the inner crown main groove 4 to have an inner end terminating before reaching the tyre equator (C). The crown lateral grooves 22 are inclined in a direction opposite to the first inner middle lateral grooves 41. The crown lateral sipes 21 and the crown lateral grooves 22 are inclined in the same direction and extend in parallel with each other.

In the crown land region 10, by the provision of the crown lateral sipes 21 on a side of the outer tread ground contact edge TE1 and the crown lateral grooves 22 on a side of the inner tread ground contact edge TE2, the rigidity of the crown land region 10 is easily increased on the side of the outer tread ground contact edge TE1 and the drainage performance of the crown land region 10 is easily improved on the side of the inner tread ground contact edge TE2. Thereby, by using the outer tread ground contact edge TE1 as the outer tread ground contact edge, it is possible that the drainage performance is easily improved while maintaining the steering stability performance and the noise performance.

It is preferred that a third chamfered portion 23 is provided at a corner portion where each of the crown lateral grooves 22 intersects with the inner crown main groove 4 at an acute angle. By the third chamfered portion 23, flows of water flowing from the crown lateral grooves 22 to the inner crown main groove 4 are promoted, therefore, it is possible that the drainage performance of the crown land region 10 is easily improved. Further, by the third chamfered portion 23, stress at the corner portions is moderated.

While detailed description has been made of the tyre of the present invention, the present invention can be embodied in various forms without being limited to the illustrated embodiment.

WORKING EXAMPLES (EXAMPLES)

Pneumatic tyres of size 215/60R16 having the basic tread pattern shown in FIG. 1 were made by way of test according to the specifications listed in Table 1, and then the test tyres were tested for the drainage performance, the noise performance, and the steering stability performance. Reference 1 was a pneumatic tyre having the tread pattern disclosed in the Patent Literature 1. The test methods were as follows.

<Drainage Performance>

Each of the test tyres was mounted on a rim of 16×7.03 and mounted on all wheels of a test vehicle (FF car with displacement of 2500 cc) under the condition of the tyre inner pressure of 250 kPa. While the test vehicle described above was driven on an asphalt road surface of a test course having a radius of 100 meters with a paddle having a depth of 5 mm and a length of 20 meters, lateral acceleration (lateral G) of the front wheels during running was measured and an average lateral G at the time when the test vehicle was driven at a speed in a range of from 50 to 80 km/h was calculated (lateral hydroplaning test). The test results are indicated by an index based on Example 1 being 100, wherein a larger numerical value is better.

<Noise Performance>

While the test vehicle was driven on a road noise measuring road (a road having a rough asphalt surface) at a speed of 60 km/h, the in-car noise was sampled at a position in the vicinity of the driver's window-side ear, and the sound pressure level was measured. The test results are indicated by an index based on the value of the Example 1 being 100, wherein a larger numerical value is better.

<Steering Stability Performance>

While a driver drove the test vehicle described above on a dry asphalt road surface of a test course with the driver being the only member on the test vehicle, characteristics relating to grip performance, steering response, and responsiveness were evaluated by the driver's feeling. The test results are indicated by an evaluation point based on the Example 1 being 100, wherein the larger the numerical value, the better the steering stability performance is.

TABLE 1

|  |  | Ref. 1 | Ref. 2 | Ex. 1 | Ex. 2 | Ex. 3 |
|---|---|---|---|---|---|---|
| Outer shoulder lateral grooves |  | Present | Present | Present | Present | Present |
| First outer shoulder sipes |  | Absent | Present | Present | Present | Present |
| Second outer shoulder sipes |  | Absent | Present | Present | Present | Present |
| Outer middle lateral grooves |  | Present | Absent | Absent | Absent | Absent |
| First outer middle sipes |  | Absent | Present | Present | Present | Present |
| Second outer middle sipes |  | Absent | Present | Present | Present | Present |
| Positional relation between First outer shoulder sipes and First outer middle sipes |  | — | independent from each other | smoothly connected | smoothly connected | smoothly connected |
| Positional relation between First outer shoulder sipes and second outer middle sipes |  | — | independent from each other | smoothly connected | smoothly connected | smoothly connected |
| Length L1/Length L2 | [%] | 83 | 67 | 67 | 40 | 40 |
| Length L3/Length L2 | [%] | — | 59 | 59 | 59 | 59 |
| Length L4/Length L5 | [%] | — | 51 | 51 | 51 | 51 |
| Drainage performance | [index] | 110 | 95 | 100 | 80 | 90 |
| Noise performance | [index] | 90 | 100 | 100 | 110 | 105 |
| Steering stability performance | [index] | 90 | 95 | 100 | 110 | 105 |
|  |  | Ex. 4 | Ex. 5 | Ex. 6 | Ex. 7 | Ex. 8 |
| Outer shoulder lateral grooves |  | Present | Present | Present | Present | Present |
| First outer shoulder sipes |  | Present | Present | Present | Present | Present |
| Second outer shoulder sipes |  | Present | Present | Present | Present | Present |
| Outer middle lateral grooves |  | Absent | Absent | Absent | Absent | Absent |
| First outer middle sipes |  | Present | Present | Present | Present | Present |
| Second outer middle sipes |  | Present | Present | Present | Present | Present |
| Positional relation between First outer shoulder sipes and First outer middle sipes |  | smoothly connected | smoothly connected | smoothly connected | smoothly connected | smoothly connected |
| Positional relation between First outer shoulder sipes and second outer middle sipes |  | smoothly connected | smoothly connected | smoothly connected | smoothly connected | smoothly connected |
| Length L1/Length L2 | [%] | 75 | 85 | 67 | 67 | 75 |
| Length L3/Length L2 | [%] | 59 | 59 | 20 | 30 | 75 |
| Length L4/Length L5 | [%] | 51 | 51 | 51 | 51 | 51 |
| Drainage performance | [index] | 110 | 120 | 90 | 95 | 105 |
| Noise performance | [index] | 95 | 90 | 105 | 102 | 98 |
| Steering stability performance | [index] | 95 | 90 | 105 | 103 | 97 |
|  |  | Ex. 9 | Ex. 10 | Ex. 11 | Ex. 12 | Ex. 13 |
| Outer shoulder lateral grooves |  | Present | Present | Present | Present | Present |
| First outer shoulder sipes |  | Present | Present | Present | Present | Present |
| Second outer shoulder sipes |  | Present | Present | Present | Present | Present |
| Outer middle lateral grooves |  | Absent | Absent | Absent | Absent | Absent |
| First outer middle sipes |  | Present | Present | Present | Present | Present |
| Second outer middle sipes |  | Present | Present | Present | Present | Present |
| Positional relation between First outer shoulder sipes and First outer middle sipes |  | smoothly connected | smoothly connected | smoothly connected | smoothly connected | smoothly connected |
| Positional relation between First outer shoulder sipes and second outer middle sipes |  | smoothly connected | smoothly connected | smoothly connected | smoothly connected | smoothly connected |

TABLE 1-continued

| | | | | | | |
|---|---|---|---|---|---|---|
| Length L1/Length L2 | [%] | 85 | 67 | 67 | 67 | 67 |
| Length L3/Length L2 | [%] | 85 | 59 | 59 | 59 | 59 |
| Length L4/Length L5 | [%] | 51 | 25 | 35 | 70 | 80 |
| Drainage performance | [index] | 110 | 90 | 95 | 105 | 110 |
| Noise performance | [index] | 95 | 105 | 102 | 98 | 95 |
| Steering stability performance | [index] | 95 | 105 | 103 | 97 | 95 |

Pneumatic tyres of size 215/60R16 having the basic tread pattern shown in FIG. 1 were made by way of test according to the specifications listed in Table 2, and then the test tyres were tested for the drainage performance, the noise performance, and the steering stability performance. Reference 3 was a pneumatic tyre having the tread pattern disclosed in the Patent Literature 1. The test methods were as follows.

<Drainage Performance>

The above-described test vehicle with the above-described test tyres mounted on all wheels thereof was driven on the above-described test course, then the average lateral G was calculated by the same method as described above (lateral hydroplaning test). The test results are indicated by an index based on Example 14 being 100, wherein a larger numerical value is better.

<Noise Performance>

The sound pressure level was measured by the same method as described above. The test results are indicated by an index based on the Example 14 being 100, wherein a larger numerical value is better.

<Steering Stability Performance>

By the same method as described above, the characteristics relating to the grip performance, the steering response, and the responsiveness were evaluated by the driver's feeling. The test results are indicated by an evaluation point based on the Example 14 being 100, wherein a larger numerical value shows better steering stability performance.

TABLE 2

| | | Ref. 3 | Ref. 4 | Ex. 14 | Ex. 15 | Ex. 16 |
|---|---|---|---|---|---|---|
| First inner middle lateral grooves | | Present | Present | Present | Present | Present |
| First inner middle lateral sipes | | Absent | Present | Present | Present | Present |
| Second inner middle lateral grooves | | Present | Present | Present | Present | Present |
| Second inner middle lateral sipes | | Absent | Present | Present | Present | Present |
| Length L6/Length L7 | [%] | 100 | 40 | 67 | 50 | 67 |
| Length L6/Length L7 | [%] | 100 | 40 | 67 | 67 | 50 |
| Length L9/Length L6 | [%] | — | 23 | 23 | 23 | 23 |
| Third inner middle lateral sipes | | Present | Present | Present | Present | Present |
| First chamfered portion | | Present | Present | Present | Present | Present |
| Second chamfered portion | | Present | Present | Present | Present | Present |
| Drainage performance | [index] | 110 | 80 | 100 | 85 | 85 |
| Noise performance | [index] | 90 | 105 | 100 | 105 | 105 |
| Steering stability performance | [index] | 90 | 105 | 100 | 105 | 105 |

| | | Ex. 17 | Ex. 18 | Ex. 19 | Ex. 20 | Ex. 21 |
|---|---|---|---|---|---|---|
| First inner middle lateral grooves | | Present | Present | Present | Present | Present |
| First inner middle lateral sipes | | Present | Present | Present | Present | Present |
| Second inner middle lateral grooves | | Present | Present | Present | Present | Present |
| Second inner middle lateral sipes | | Present | Present | Present | Present | Present |
| Length L6/Length L7 | [%] | 67 | 67 | 67 | 67 | 67 |
| Length L6/Length L7 | [%] | 67 | 67 | 67 | 67 | 67 |
| Length L9/Length L6 | [%] | 10 | 15 | 35 | 40 | 23 |
| Third inner middle lateral sipes | | Present | Present | Present | Present | Absent |
| First chamfered portion | | Present | Present | Present | Present | Present |
| Second chamfered portion | | Present | Present | Present | Present | Present |
| Drainage performance | [index] | 95 | 97 | 103 | 105 | 97 |
| Noise performance | [index] | 102 | 100 | 98 | 98 | 100 |
| Steering stability performance | [index] | 102 | 102 | 98 | 96 | 102 |

| | | Ex. 21 | Ex. 22 |
|---|---|---|---|
| First inner middle lateral grooves | | Present | Present |
| First inner middle lateral sipes | | Present | Present |
| Second inner middle lateral grooves | | Present | Present |
| Second inner middle lateral sipes | | Present | Present |
| Length L6/Length L7 | [%] | 67 | 67 |
| Length L6/Length L7 | [%] | 67 | 67 |
| Length L9/Length L6 | [%] | 23 | 23 |
| Third inner middle lateral sipes | | Present | Present |
| First chamfered portion | | Absent | Present |
| Second chamfered portion | | Present | Absent |
| Drainage performance | [index] | 97 | 97 |
| Noise performance | [index] | 100 | 100 |
| Steering stability performance | [index] | 102 | 102 |

As is clear from Table 1 and Table 2, it was confirmed that the drainage performance, the noise performance, and the steering stability performance of the tyres as the Examples were significantly improved in a good balance, as compared with the tyres as the References.

The invention claimed is:

1. A tire comprising a tread portion comprising:
a first tread ground contact edge positioned on one side of a tire equator,
a second tread ground contact edge positioned on the other side of the tire equator,
a first shoulder main groove extending continuously in a tire circumferential direction on a side of the first tread ground contact edge,
a first crown main groove extending continuously in the tire circumferential direction between the first shoulder main groove and the tire equator,
a first middle land region defined between the first shoulder main groove and the first crown main groove, and
a first shoulder land region defined between the first tread ground contact edge and the first shoulder main groove,
wherein the first shoulder land region is provided with
a plurality of first shoulder lateral grooves each extending inwardly in a tire axial direction from the first tread ground contact edge to have a first inner end in the tire axial direction within the first shoulder land region,
first shoulder lateral sipes each connecting between the first inner end of a respective one of the first shoulder lateral grooves and the first shoulder main groove, and
a plurality of second shoulder lateral sipes each extending inwardly in the tire axial direction from the first tread ground contact edge to have a second inner end on an outer side in the tire axial direction of the first inner end,
the first middle land region is provided with a plurality of middle lateral sipes each smoothly connected with a respective one of the first shoulder lateral sipes with the first shoulder main groove therebetween, and
the middle lateral sipes include first middle lateral sipes each connecting between the first shoulder main groove and the first crown main groove and second middle lateral sipes each having a third inner end within the first middle land region.

2. The tire according to claim 1, wherein
each of the second shoulder lateral sipes is arranged between the first shoulder lateral grooves adjacent to each other in the tire circumferential direction.

3. The tire according to claim 1, wherein
a length in the tire axial direction of each of the first shoulder lateral grooves is in a range of from 50% to 75% of a length in the tire axial direction of the first shoulder land region.

4. The tire according to claim 1, wherein
an angle of each of the first shoulder lateral grooves with respect to the tire axial direction is in a range of from 5 to 12 degrees.

5. The tire according to claim 1, wherein
an angle of each of the middle lateral sipes with respect to the tire axial direction is in a range of from 5 to 35 degrees.

6. The tire according to claim 1, wherein
a length in the tire axial direction of each of the second shoulder lateral sipes is in a range of from 30% to 75% of a length in the tire axial direction of the first shoulder land region.

7. The tire according to claim 1, wherein
a length in the tire axial direction of each of the second middle lateral sipes is in a range of from 35% to 70% of a length in the tire axial direction of the first middle land region.

8. The tire according to claim 1 further comprising:
a second shoulder main groove extending continuously in the tire circumferential direction on a side of the second tread ground contact edge,
a second crown main groove extending continuously in the tire circumferential direction between the second shoulder main groove and the tire equator, and
a second middle land region defined between the second shoulder main groove and the second crown main groove,
wherein the second middle land region is provided with
a plurality of first middle lateral grooves each extending inwardly in the tire axial direction from the second shoulder main groove to have a fourth inner end in the tire axial direction within the second middle land region,
third middle lateral sipes each connecting between the fourth inner end of a respective one of the first middle lateral grooves and the second crown main groove,
a plurality of second middle lateral grooves each extending inwardly in the tire axial direction from the second shoulder main groove to have a fifth inner end in the tire axial direction within the second middle land region, and
fourth middle lateral sipes each extending inwardly in the tire axial direction from the fifth inner end of a respective one of the second middle lateral grooves to have a sixth inner end in the tire axial direction within the second middle land region, and
a length in the tire axial direction of each of the second middle lateral grooves is 50% or more of a length in the tire axial direction of the second middle land region.

9. The tire according to claim 8, wherein
each of the second middle lateral grooves are provided between the first middle lateral grooves adjacent to each other in the tire circumferential direction.

10. The tire according to claim 8, wherein
a length in the tire axial direction of each of the first middle lateral grooves is 50% or more of a length in the tire axial direction of the second middle land region.

11. The tire according to claim 8, wherein
each of fifth middle lateral sipes is provided between a respective one of pairs of the first inner middle lateral groove and the second inner middle lateral groove adjacent to each other in the tire circumferential direction, and
each of the fifth middle lateral sipes extends inwardly in the tire axial direction from the second shoulder main groove to have a seventh inner end in the tire axial direction within the second middle land region.

12. The tire according to claim 8, wherein
the first middle lateral grooves and the second middle lateral grooves are inclined in the same direction with respect to the tire axial direction.

13. The tire according to claim 8, wherein
a length in the tire axial direction of each of the first middle lateral grooves is in a range of from 60% to 80% of a length in the tire axial direction of the second middle land region.

14. The tire according to claim 8, wherein
the tread portion is provided with a second shoulder land region defined between the second tread ground contact edge and the second shoulder main groove, and
the second shoulder land region is provided with a plurality of second shoulder lateral grooves each extending inwardly in the tire axial direction from the second tread ground contact edge to have a eighth inner end in the tire axial direction within the second shoulder land region, and third shoulder lateral sipes each connecting between the eighth inner end of a respective one of the second shoulder lateral grooves and the second shoulder main groove.

15. The tire according to claim 14, wherein
a length in the tire axial direction of each of the second shoulder lateral grooves is 50% or more of a length in the tire axial direction of the second shoulder land region.

16. The tire according to claim 14, wherein
an angle of each of the second shoulder lateral grooves with respect to the tire axial direction is in a range of from 5 to 12 degrees.

17. The tire according to claim 14, wherein
the tread portion is provided with a plurality of fourth shoulder lateral sipes each connecting between the second tread ground contact edge and the second shoulder main groove, and
each of the fourth shoulder lateral sipes is arranged between a respective pair of the second shoulder lateral grooves adjacent to each other in the tire circumferential direction.

18. The tire according to claim 1, wherein
a groove width of the first shoulder main groove is smaller than a groove width of the first crown main groove.

19. The tire according to claim 8, wherein
a groove width of the first shoulder main groove is smaller than a groove width of the second shoulder main groove and a groove width of the second crown main groove.

20. The tire according to claim 1, wherein
when the tire is mounted on a vehicle, the first tread ground contact edge is an outer tread ground contact edge positioned on an outer side of the vehicle.

\* \* \* \* \*